Nov. 14, 1950  C. G. MUENCH  2,530,026
APPARATUS FOR SATURATING EDGE PORTIONS OF FIBERBOARDS
Filed Oct. 25, 1945  4 Sheets-Sheet 1

Inventor:
Carl G. Muench.
By Edw. A. Hampson
Attorney.

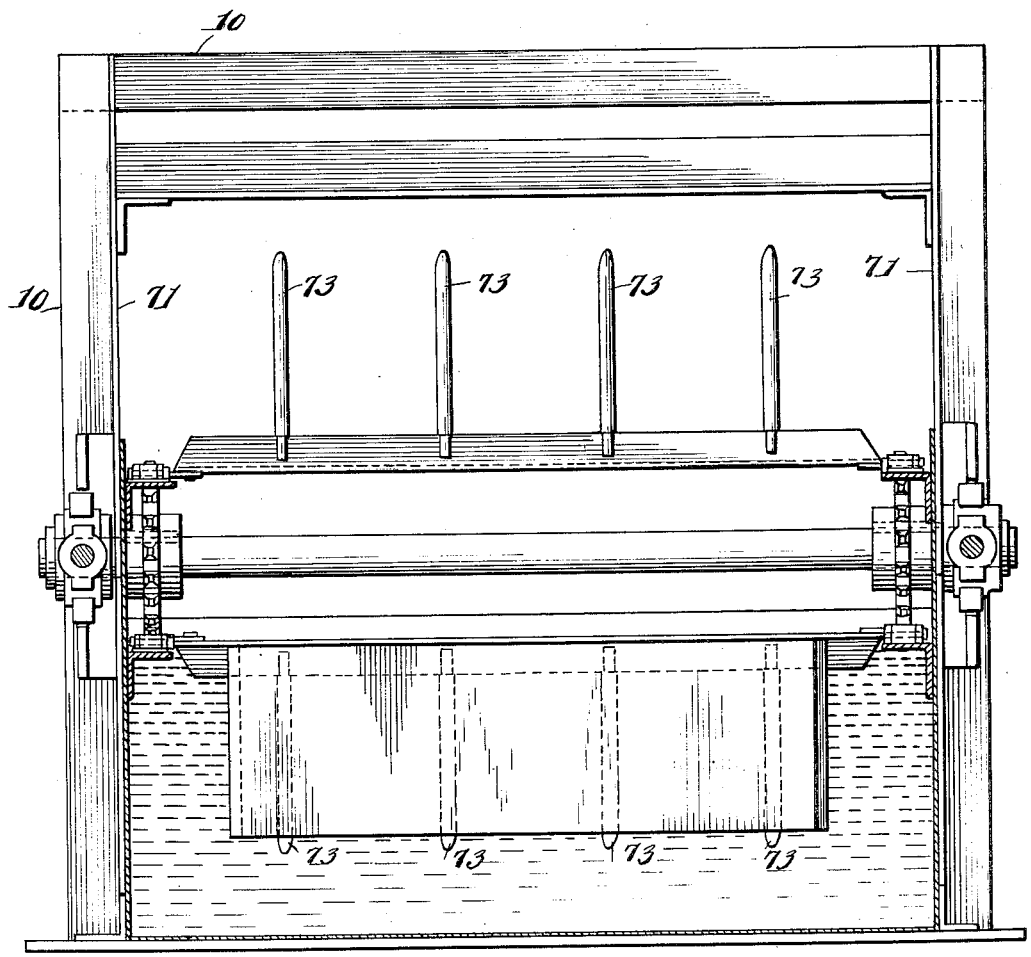

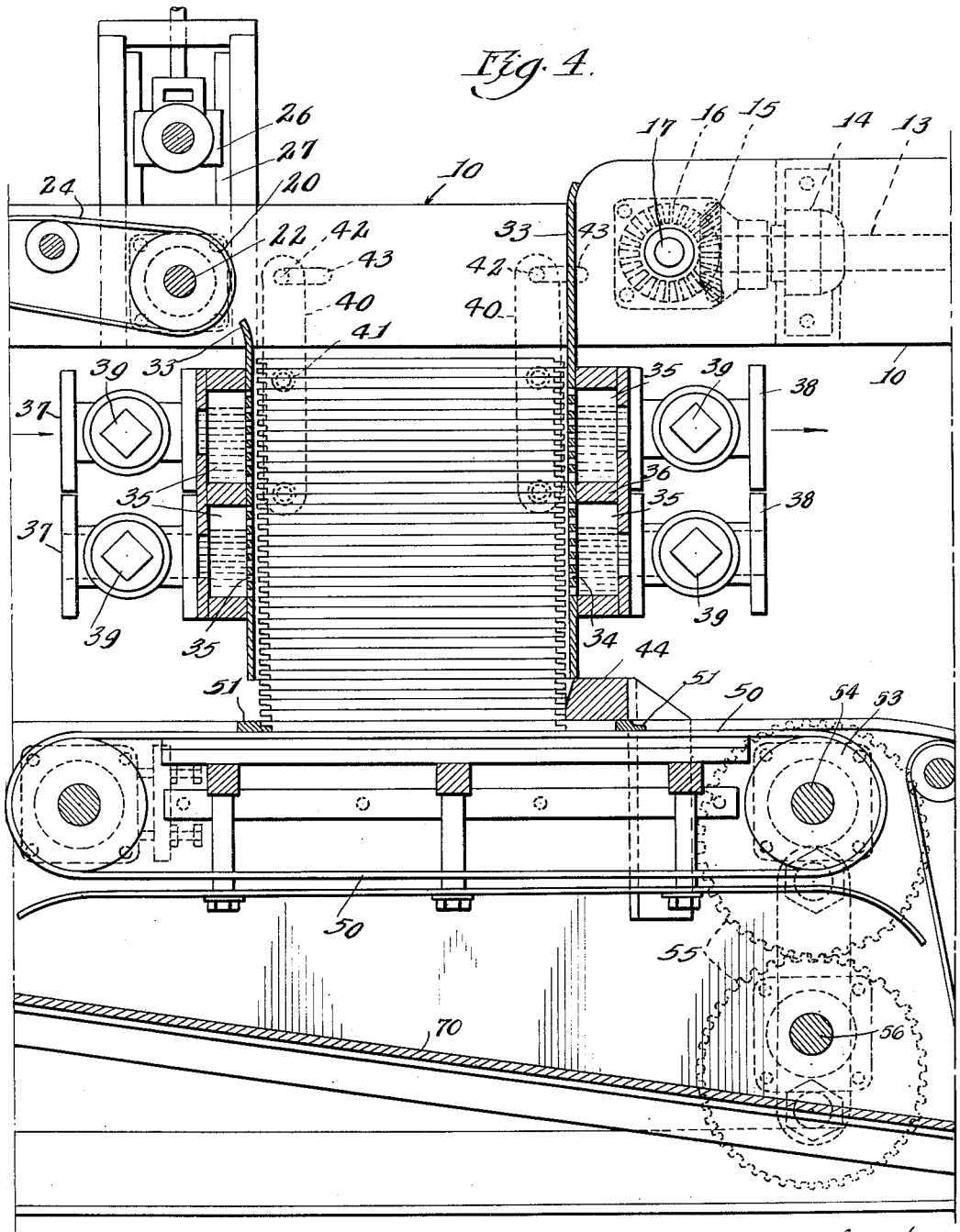

Patented Nov. 14, 1950

2,530,026

UNITED STATES PATENT OFFICE 2,530,026

APPARATUS FOR SATURATING EDGE PORTIONS OF FIBERBOARDS

Carl G. Muench, Glenview, Ill., assignor to The Celotex Corporation, Chicago, Ill., a corporation of Delaware Application October 25, 1945, Serial No. 624,505

4 Claims. (Cl. 91—43)

This invention relates to a new and improved apparatus for saturating the edges of fiber insulation boards, and its particular purpose is that of providing an apparatus wherein, in commercial manufacture, a high rate of production may be achieved.

In the past, the edges of sheet materials, as, for example, fiber insulation board, have been saturated by passing such sheets on edge by hand, or by suitable mechanism, through a shallow layer of the saturant, or, by hand, or by suitable mechanism, dipping the edges of the sheets to the required depth in the saturant.

The method or the mode of obtaining the edge saturation at a high production rate by the use of the apparatus herein disclosed involves the stacking of a number of sheets, the edges of which are to be saturated and the supply of the saturant to the edges of such stack, with provision being made for continually moving the elements from the bottom of the stack and adding fresh elements to the top of the stack so that the operation is a continuous operation.

Briefly described, the device for carrying out the invention comprises a feed means for feeding successive sheets in horizontal position into a vertical hopper to form a pile of sheets, the edges of which are exposed. The hopper, to at least a portion of its height, is provided with suitable openings so that by surrounding a portion of the hopper with a suitable enclosure, or the like, the saturant may be fed into such enclosure to flow from the openings provided in the sides of the hopper to thereby bring into contact with the edges of the stack of material in the hopper a layer of saturant which is being continually replaced by additional saturant discharged through the openings in the walls of the hopper. At the bottom of the stack of sheets referred to, there is provided a conveyor mechanism which successively removes the sheets from the bottom of the stack and carries them to a tank saturator, or coater, where the surfaces of the entire sheet may be further saturated or coated. Or this take-off conveyor may convey the edge saturated sheets to any other apparatus for subsequent fabricating or manufacturing operations.

The saturating apparatus is illustrated in the accompanying drawings, wherein—

Figure 3 is a section through Figure 2 taken on line 3—3; and

Figure 4 is an enlarged view particularly in section of the principal parts of the apparatus.

Figure 1:
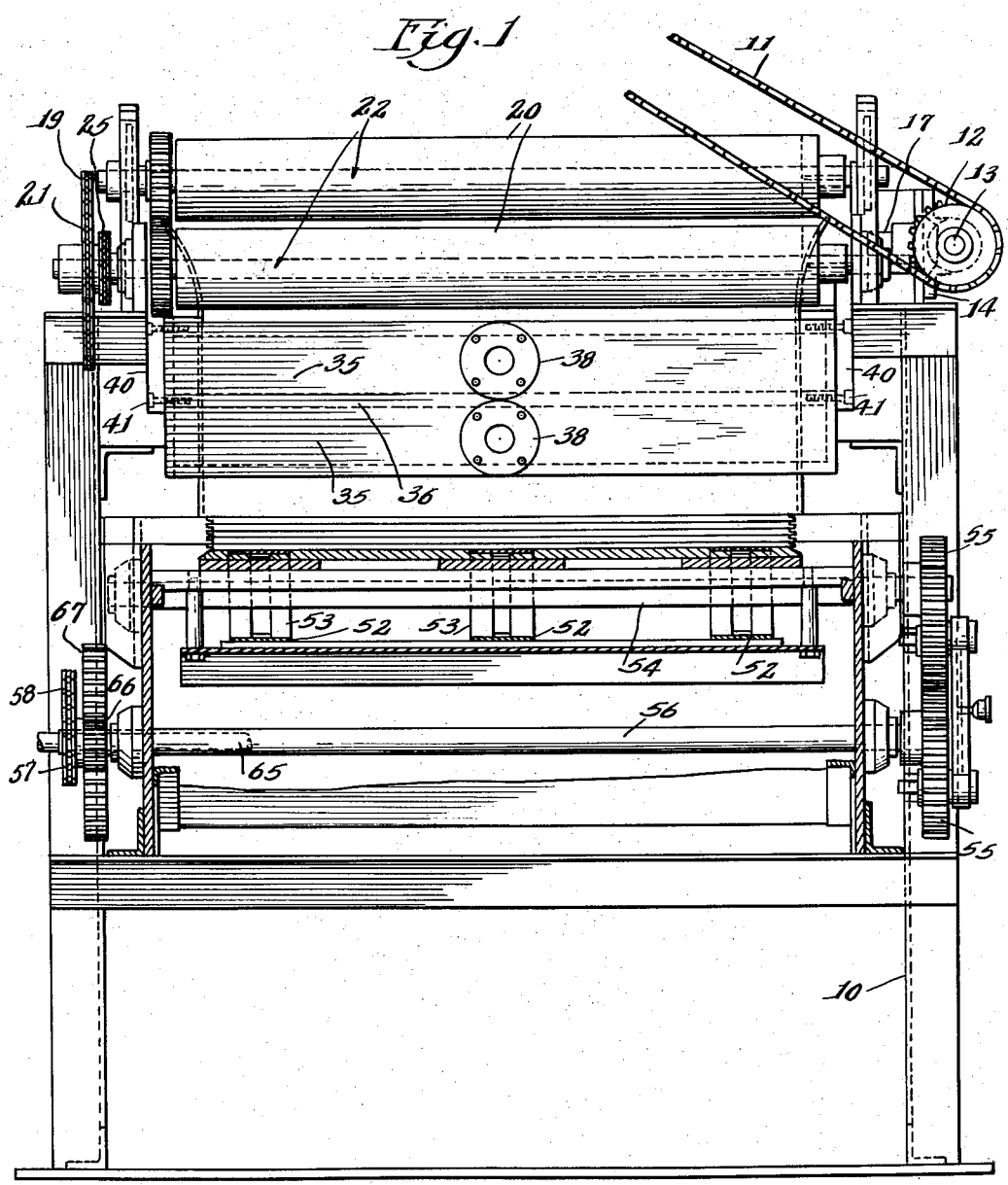
Figure 1 is an end view of the apparatus, some parts being broken away for clearness of illustration.
Figure 2:
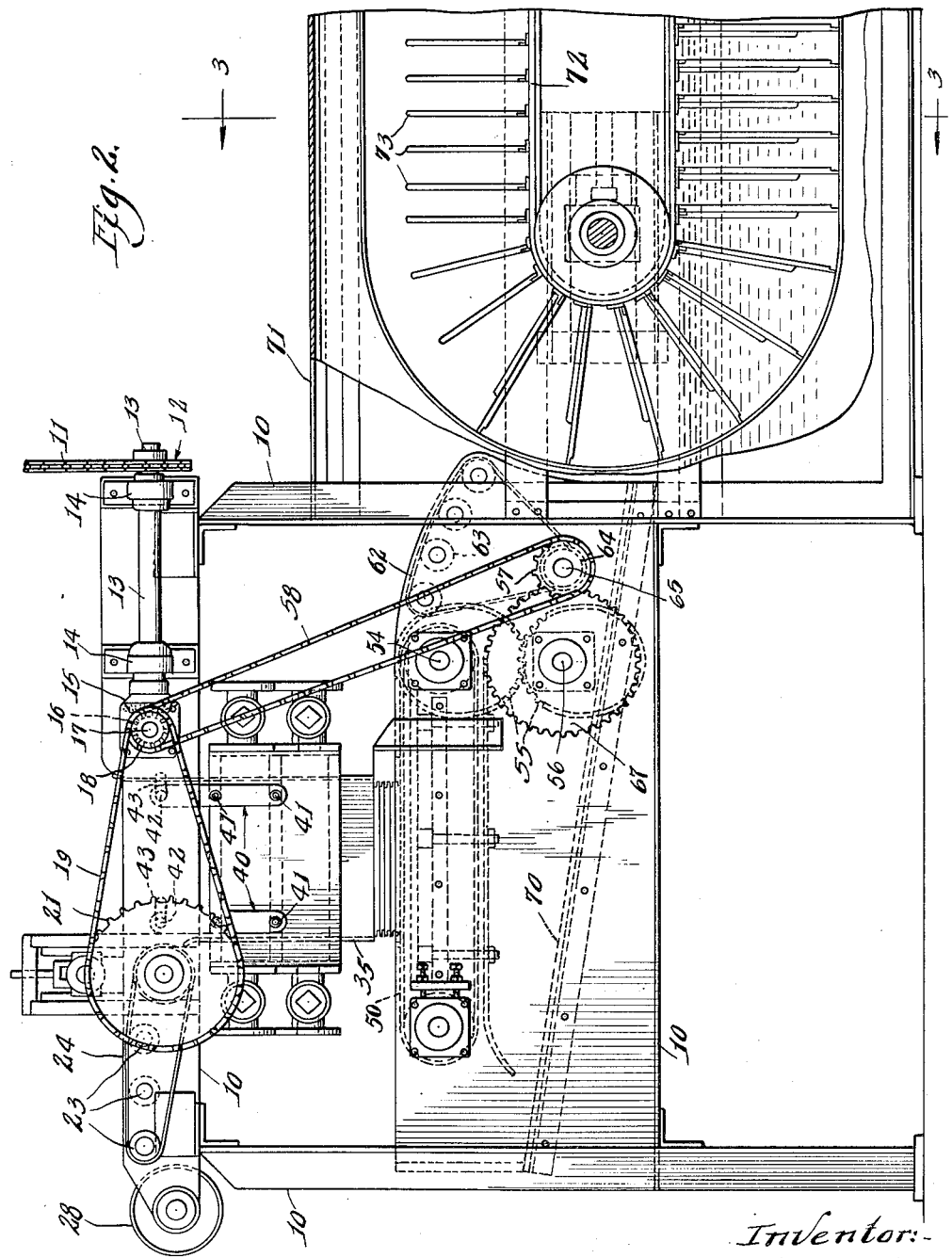
Figure 2 is a side elevation of the saturator.

In the drawings, the saturator device comprises, of course, a suitable structural framework generally designated by the numeral 10, and on which are mounted the various elements of the device which are driven by chain 11. Chain 11 drives a sprocket 12 which is mounted on a driving shaft 13 mounted in bearings 14 which, in turn, are suitably secured to a portion of the main frame 10. On the other end of shaft 13 there is provided a bevel gear 15 which, in turn, drives bevel gear 16 which is mounted on shaft 17 positioned at right angles to shaft 13.

On shaft 17 there is also mounted a small sprocket wheel 18 which, through chain 19, drives feed rolls 20 by means of sprocket 21 which is mounted on shaft 22 of the lower feed roll 20.

For carrying sheets or boards to the feed rolls 20 to be fed into the hopper of the device, there is provided a suitable conveyor which is shown as comprising three driven rolls 23 carrying suitable conveyor belt or chain 24. Feed rolls 23 may be driven by a suitably mounted sprocket, not shown, driven from sprocket wheel 25 by means of a connecting drive chain.

Provision may be made, of course, for adjusting the feeding conveyor by mounting the left hand feed roll 23 adjustable horizontally, an adjustment which is well known to those skilled in the art, or any other usual means may be employed for taking up any slack in conveyor belt 24. The illustration of means for taking up any slack in conveyor belt 24 has been omitted from the drawing in the interest of simplifying and making the drawings more readily understandable.

Means also are preferably provided for adjusting feed rolls 20 to provide for feeding of materials of varying thickness and, as illustrated, the shaft 22 of the upper feed roll 20 is mounted in a vertically adjustable bearing 26 which, by a suitable screw, as is well understood, may be adjusted vertically on guides 27.

Sheets of fiber board or the like which may be fed from a suitable conveyor, which is indicated by roll 28, are fed to the feed conveyor belt 24 to the feed rolls 20 by which the boards are fed to the hopper where they are saturated.

The hopper, which is located ahead of the feed rolls 20, is in effect merely a box having an open top and bottom and which is formed by the walls 33. In order that the hopper 33 may properly receive the sheets fed by rolls 20, the wall adjacent the rolls 20 terminates at some distance below the top of the lower roll 20; whereas, on the other hand, the far wall of the hopper extends upwardly to above the top of the bottom roll 20 so that sheets projected from feed rolls 20 will be properly received in the hopper to form a stack of boards therein. What might be termed the side walls, as distinguished from the back and front walls of the hopper, are not illustrated in the drawing, but they will readily be visualized as completing the walls forming the open box hopper, and the upper portions of these side walls may, of course, be slightly flared, as are the upper portions of the back and front walls of the hopper, as such walls are illustrated in the drawings. By the outward flare of the top edges of the outer walls of hopper 33, the sheets as they are delivered are guided so as to stack evenly within the hopper.

The sides of the hopper 33 where it is desired that the edges of the boards in the hopper be saturated, the walls are provided with a large number of small openings or perforations 34, the size of which and spacing, while not critical, will, for any particular conditions of saturation, necessarily have to be determined experimentally. In connection with the perforations 34 through the walls of hopper 33, these should be of such size and spacing that the saturant will discharge through these openings 34 at a rate greater than that at which the saturant is absorbed by the edges of the stack of boards in the hopper. Excess saturant may find its way down around the edges of the pile of sheets and drain into receptacle 70. Of course, it follows that if the edges of the boards are highly absorbent, then a larger amount of saturant must be fed through the openings 34 than in a case where the edges of the board are not so absorbent. Also the quantity of the saturant which it is desired should be absorbed by the edges of the board and the flow characteristic of the saturant enter into the determination of the size of the openings and their spacing. Still further, the saturant itself is also a determining factor in connection with the size and spacing of the openings 34, that is, for example, if the saturant is relatively non-fluid, that is, is relatively viscous, then the size of the openings and the number of openings must be relatively large so that sufficient saturant will pass through. Whereas, on the other hand, if the saturant, under conditions of use, is relatively fluid, then the openings may be smaller and the spacing of the openings greater. For use with ordinary saturating asphalt with a melt point of about 140° F., or thereabouts, and for a fairly thorough saturation of the edges of average fiber insulation board, the holes will be about one-fourth inch in diameter spaced one inch center to center. Of course, the amount of the saturant which passes through openings 34 may be varied more or less depending on the pressure at which the saturant is supplied, and within any reasonable range the size of perforations and spacing, as previously mentioned, will be satisfactory through a considerable range of variations of saturating conditions. It is, of course, to be understood that the amount of saturant absorbed by the edges of the sheets of the boards may be varied by operating the device more slowly or more rapidly, in which case the device, with otherwise fixed conditions of saturation, if operated more rapidly, the saturation of individual sheet boards will decrease; whereas, if the apparatus is operated more slowly, the edges of the individual sheets will be more heavily saturated.

Surrounding the hopper 33 there is a saturant chamber 35 which may be integral with the hopper walls 33 or may be fabricated from individual parts, as desired. The purpose of the saturant chamber is merely that of providing a chamber, one side of which comprises a wall of hopper 33 having the openings or perforations 34 therethrough, and it will, of course, be understood that the specific manner of construction of the saturant chamber 35 is relatively immaterial so long as its function is served.

As shown, in order to maintain a relatively uniform flow of the saturant through the perforations 34, the saturant chamber is divided into two parts by a partition 36, and each of the separate upper and lower saturant chambers so provided are also provided with a suitable inlet 37 and outlet 38, each such inlet and outlet being provided with a suitable valve 39. By the provision of the inlet and outlet for each saturant chamber 35, and by the manipulation of the valve 39, a constant flow of heated saturant may be maintained through the saturating chambers in addition to that quantity of the saturant which exudes through perforations 34, and thus by maintaining a continuous flow of excess hot saturant through the saturant chambers 35, the saturating material does not have an opportunity to cool and harden in the saturating chambers. Of course, the saturating chambers need not be limited to two separate chambers 35, and it will, of course, be understood that should there be a greater amount of saturant to be absorbed by the edges of the boards in the hopper than can be supplied with the perforations and saturant chambers, as shown, that without involving invention, the height of the hopper 33 may be increased and additional perforations and enclosing saturant chambers 35 may be provided.

The saturant chambers 35 and the walls 33, forming a hopper as a unit, are mounted so that if required for proper reception of the boards to be saturated this unit may be adjusted laterally. The lateral adjustment of the hopper unit is made possible by its suspended mounting comprising straps 40, which are suitably secured to the side walls of hopper 33 by bolts or rivets 41, and extend upwardly above the side walls. The upper ends of the straps 40 are mounted on bolts 42 which pass through longitudinal slots 43 in a portion of the machine frame, as is clearly apparent in particular in Figure 4 of the drawing. By the mounting of the upper ends of straps 40 from longitudinal slots 43, it consequently follows that hopper 33 may be readily adjusted forwardly or back to the extent of the length of such slots 43.

At the bottom of hopper 33, along the front edge of the hopper, there is provided an abutment or stop 44 which, it will be noted, is so positioned as to prevent a forward movement of any except the bottom board in the stack of boards in hopper 33. Of course, instead of providing a separate abutment 44, the front wall of hopper 33 might be extended downwardly in lieu thereof.

Positioned below the hopper 33 there is provided a take-off conveyor 50 which is so positioned below the hopper that it will remove one by one the bottom-most sheet of the stack of boards issuing from the hopper at the bottom. Conveyor 50 is provided with flights or stops 51 which, in connection with the particular edge construction of the boards, as shown in the drawing, a shiplapped edge, has a stepped construction complemental to the form of the board edge. Conveyor 50, as shown, comprises chains 52 which run on wheels 53 in turn mounted on a shaft 54 and driven by gears 55, which are oval gears designed to provide for a slow pickup of the load with acceleration after the initial pickup so as to rapidly remove the board from the stack after it has been contacted by flight 51.

The lower gear 55 is mounted on a shaft 56, on the other end of which is mounted gear 67. Gear 67 is driven by gear 66 mounted on shaft 65 carrying sprocket 57 and driven by chain 58 which is driven by a sprocket mounted on driving shaft 17.

Conveyor 50 discharges the edge-saturated sheets on to a discharge conveyor 62 which runs over conveyor rolls 63 being driven by a driven conveyor roll 64. Driven conveyor roll 64 is mounted on shaft 65 driven by gear 66 which meshes with gear 67 which is mounted on shaft 56

In the drawing, various details in connection with the take-off conveyor 50 are not shown, such as a take-up adjustment and side supports for the conveyed sheets, but since such details are well known to those skilled in the art they will not be described, such description not being necessary to an understanding of the invention.

Below the take-off conveyor 50 and discharge conveyor 62 there is provided a downwardly sloping trough or receptacle 70 which will catch any excess saturant which may be discharged from the saturating portion of the device, and such excess material, due to the inclination of trough 70, will be discharged into a surface saturator which is shown as associated with the apparatus which has heretofore been described.

The surface saturator comprises a tank 71 in which is maintained a pool of the material with which the sheets are to be surface saturated. In tank 71 there is suitably mounted a leaf conveyor generally designated at 72, and provided with leaves 73, between which the edge-saturated sheets are discharged which is clearly apparent in the drawings. The leaf conveyor 72 submerges the individual sheets or boards in the pool of saturant contained in tank 71, and at the far end of this tank, as the surface-saturated boards are brought above the surface of the saturant by the movement of the conveyor, they may be removed therefrom in any desired manner.

It will be seen that in the foregoing there has been described an apparatus for accomplishing in production the high speed fiber board edge saturation, and wherein, by suitable variation of the various features of operation, as will be well understood by those skilled in the art, a controllable edge saturation may be carried out.

Briefly summarizing the operation of the apparatus, the fiber boards, or similar sheets, the edges of which are to be saturated, are fed to the apparatus over feed rolls 28, and by conveyor belt 24 are fed to what might be termed the stacking rolls 20. These latter stacking or feed rolls 20 discharge the individual sheets, one on top of another, received in hopper 33 wherein a solid aligned stack of boards is built up.

In the hopper 33, the walls of the hopper are provided with multitudinous openings through which the saturant exudes, so that the edges of the pile of sheets in the hopper are, during their travel through the hopper, continuously subjected to a film or layer of the saturant issuing from the inner face of the hopper walls. By proper co-relation of the properties of the saturant and of the rate of passage of the pile of boards through the hopper, any desired degree of saturation may be obtained.

Below hopper 33 there is provided a take-off conveyor which comprises chains 50 carrying formed flights 51 which successively remove from the bottom of the pile the lower-most sheet of the pile and carry it away to keep the pile of boards in hopper 33 moving downwardly through the hopper to accommodate boards as they are supplied at the top of the pile.

The boards, the edges of which have been saturated in accordance with the foregoing, are carried by conveyor chains 50 to a discharge conveyor 62 which discharges the individual sheets into the spaces between the leaves 73 of conveyor 72 in a saturating tank, wherein the such conveyor 72 carries the individual boards into a pool of saturant and finally brings the boards above the surface of the saturant, whereupon they may be removed from the conveyor.

The inventions hereof having been described in detail, what I claim is:

1. In an apparatus for saturating the edges of felted fiber boards, a foraminous wall, means superposing a plurality of sheets of board form material into a stack having an edge face, means positioning and retaining an edge of the stack substantially in contact with a face of the foraminous wall and means supplying saturant under pressure against that side of the foraminous wall remote from its surface which is substantially in contact with an edge face of the stack of boards.

2. In an apparatus for saturating the edges of felted fiber sheets, means positioning a pile of such sheets superimposed flatways horizontally, a foraminous wall with which an edge face of such pile of sheets is substantially in contact, the edge face of the pile caused to move downwardly as a continuous surface past the foraminous wall, means successively removing sheets from the bottom of the pile and means successively adding sheets at the top of the pile, a housing associated with the foraminous wall and together with the wall comprising a chamber, and means supplying saturant under pressure to the chamber.

3. An apparatus for saturating the edges of sheet fiber material comprising spaced walls between which a plurality of sheets are received horizontally, means successively feeding sheets to the top between the spaced walls, means for the removing of sheets successively at the bottom of the spaced walls, the spaced walls provided with multitudinous openings therethrough and means forcing a saturant through the multitudinous openings whereby saturant is supplied to the edges of a stack of sheets positioned between the walls.

4. Apparatus for saturating the edges of felted fiber boards and comprising: a sheet feeder, a sheet aligning sheet receiver comprising spaced vertical members between which sheets discharged from the feeder are received and piled, a conveyor positioned transversely of the sheet receiver across the lower end thereof, spaced flights on the conveyor for contacting an edge of the bottom sheet in the receiver and withdrawing the sheet from the pile, the sheet receiver comprising spaced foraminous walls, a housing connected to a foraminous wall and forming a chamber therewith one wall of which is foraminous, an inlet and an outlet in said housing and means circulating saturant under pressure through the chamber.

CARL G. MUENCH.

(References on following page)

REFERENCES CITED

The following references are of record in the file of this patent:

UNITED STATES PATENTS

| Number | Name | Date |
|---|---|---|
| 964,133 | Strehler | July 12, 1910 |
| 1,265,127 | Sleeper | May 7, 1918 |
| 1,724,179 | Bullerjahn | Aug. 13, 1929 |
| 1,895,617 | Fay | Jan. 31, 1933 |
| 2,000,226 | Fry | May 7, 1935 |
| 2,016,316 | Collins | Oct. 8, 1935 |
| 2,162,773 | Bronander | June 20, 1939 |
| 2,354,216 | MacKenzie | July 25, 1944 |
| 2,361,818 | Brightwell | Oct. 31, 1944 |